United States Patent
Gardner et al.

(10) Patent No.: US 12,406,519 B1
(45) Date of Patent: Sep. 2, 2025

(54) TECHNIQUES FOR EXTRACTING LINKS AND CONNECTIVITY FROM SCHEMATIC DIAGRAMS

(71) Applicant: Bentley Systems, Incorporated, Exton, PA (US)

(72) Inventors: Marc-André Gardner, Quebec (CA); Simon Savary, Quebec (CA); Evan Rausch-Larouche, Quebec (CA); Raphaël Melancon, Quebec (CA); Karl-Alexandre Jahjah, Quebec (CA)

(73) Assignee: Bentley Systems, Incorporated, Exton, PA (US)

( * ) Notice: Subject to any disclaimer, the term of this patent is extended or adjusted under 35 U.S.C. 154(b) by 518 days.

(21) Appl. No.: 17/877,560

(22) Filed: Jul. 29, 2022

(51) Int. Cl.
*G06K 9/00* (2022.01)
*G06V 30/19* (2022.01)
(Continued)

(52) U.S. Cl.
CPC ...... *G06V 30/422* (2022.01); *G06V 30/19167* (2022.01); *G06V 30/414* (2022.01)

(58) Field of Classification Search
CPC ...... G06V 30/414; G06V 10/40; G06V 10/70; G06V 10/82; G06V 30/19167;
(Continued)

(56) References Cited

U.S. PATENT DOCUMENTS

| | | |
|---|---|---|
| 5,097,422 A | 3/1992 | Corbin, II et al. |
| 5,111,413 A | 5/1992 | Lazansky et al. |

(Continued)

FOREIGN PATENT DOCUMENTS

| | | |
|---|---|---|
| EP | 3660743 A1 | 6/2020 |
| JP | 3445394 B2 | 9/2003 |
| WO | WO-2014/075174 A1 | 5/2014 |
| WO | WO-2020/005541 A1 | 1/2020 |
| WO | WO-2021/021624 A1 | 2/2021 |

OTHER PUBLICATIONS

Gao, W., Zhao, Y., & Smidts, C. (2020). Component detection in piping and instrumentation diagrams of nuclear power plants based on neural networks. Progress in Nuclear Energy, 128, 103491. (Year: 2020).*

(Continued)

*Primary Examiner* — Gregory A Morse
*Assistant Examiner* — Kevin M Coomber
(74) *Attorney, Agent, or Firm* — Cesari and McKenna, LLP; James A. Blanchette

(57) ABSTRACT

In example embodiments, techniques are provided for using a combination of multiple ML models and signal processing to extract links and connectivity from a schematic diagram in an image-only format. A first ML model (i.e. link segmenter) may produce a first set of predictions about the positions of link segments in the schematic diagram (e.g., in the form of a segmentation map). A second ML model (i.e. keypoint detector) may produce a second set of predictions about starting and stopping points of link segments in the schematic diagram (e.g., in the form of one or more heatmaps). A signal processing module may combine the first set of predictions and the second set of predictions to produce a description of links and connectivity they provide (e.g., combining the segmentation map with data from the one or more heatmaps). The results of the combining may be saved as a graph connectivity matrix.

23 Claims, 12 Drawing Sheets

(51) Int. Cl.
*G06V 30/414* (2022.01)
*G06V 30/422* (2022.01)

(58) Field of Classification Search
CPC ...... G06V 30/422; G06N 20/00; G06N 3/045; G06N 20/20; G06N 5/046; G06F 40/30; G06F 18/217; G06T 11/60
See application file for complete search history.

(56) References Cited

U.S. PATENT DOCUMENTS

| | | | |
|---|---|---|---|
| 5,164,911 | A | 11/1992 | Juran et al. |
| 5,351,197 | A | 9/1994 | Upton et al. |
| 5,594,809 | A | 1/1997 | Kopec et al. |
| 5,617,327 | A | 4/1997 | Duncan |
| 5,625,798 | A | 4/1997 | Badders et al. |
| 7,574,048 | B2 | 8/2009 | Shilman et al. |
| 8,775,934 | B2 | 7/2014 | Nasle et al. |
| 8,837,294 | B2 | 9/2014 | Frishberg et al. |
| 8,977,527 | B2 | 3/2015 | McKim et al. |
| 9,015,016 | B2 | 4/2015 | Lorenz et al. |
| 9,721,157 | B2 | 8/2017 | Frank et al. |
| 9,811,251 | B2 | 11/2017 | Kling et al. |
| 10,558,780 | B1 | 2/2020 | Kukal et al. |
| 11,475,307 | B2* | 10/2022 | Sharma ........... G06N 3/082 |
| 11,501,470 | B2 | 11/2022 | Hassan et al. |
| 11,521,026 | B2 | 12/2022 | Lapointe et al. |
| 11,593,666 | B2 | 2/2023 | McCarthy et al. |
| 11,842,035 | B2 | 12/2023 | Jahjah et al. |
| 12,175,337 | B2 | 12/2024 | Gardner et al. |
| 2001/0033694 | A1 | 10/2001 | Goodman et al. |
| 2003/0130992 | A1 | 7/2003 | Tyan et al. |
| 2005/0155030 | A1 | 7/2005 | DeWitt, Jr. et al. |
| 2007/0022399 | A1 | 1/2007 | Tsai et al. |
| 2007/0201752 | A1 | 8/2007 | Gormish et al. |
| 2008/0052638 | A1 | 2/2008 | Frank et al. |
| 2008/0063279 | A1 | 3/2008 | Vincent et al. |
| 2009/0074300 | A1 | 3/2009 | Hull et al. |
| 2009/0100050 | A1 | 4/2009 | Erol et al. |
| 2009/0292514 | A1 | 11/2009 | McKim et al. |
| 2009/0313245 | A1 | 12/2009 | Weyl et al. |
| 2011/0007366 | A1 | 1/2011 | Sarkar et al. |
| 2012/0116559 | A1 | 5/2012 | Davis et al. |
| 2012/0134576 | A1 | 5/2012 | Sharma et al. |
| 2012/0284012 | A1 | 11/2012 | Rodriguez et al. |
| 2013/0173632 | A1 | 7/2013 | Birdwell et al. |
| 2014/0009612 | A1 | 1/2014 | King |
| 2014/0080428 | A1 | 3/2014 | Rhoads et al. |
| 2014/0336992 | A1 | 11/2014 | Kling et al. |
| 2015/0269431 | A1 | 9/2015 | Haji et al. |
| 2016/0161930 | A1 | 6/2016 | Jirkovsky et al. |
| 2017/0061031 | A1* | 3/2017 | Jammikunta ......... G06T 11/206 |
| 2017/0351708 | A1 | 12/2017 | Lahmann et al. |
| 2018/0114101 | A1 | 4/2018 | Desai et al. |
| 2019/0012424 | A1 | 1/2019 | Brookshire |
| 2020/0005094 | A1 | 1/2020 | Sinha et al. |
| 2020/0175211 | A1 | 6/2020 | Kang et al. |
| 2020/0175372 | A1 | 6/2020 | Sharma et al. |
| 2020/0184278 | A1 | 6/2020 | Zadeh et al. |
| 2020/0387553 | A1* | 12/2020 | Tyulyaev ............ G06F 18/2413 |
| 2021/0096523 | A1 | 4/2021 | Stump et al. |
| 2021/0174128 | A1 | 6/2021 | Charnock et al. |
| 2021/0278960 | A1 | 9/2021 | Mabote |
| 2021/0279271 | A1 | 9/2021 | Khanafer et al. |
| 2022/0044146 | A1 | 2/2022 | Gardner et al. |
| 2022/0319219 | A1 | 10/2022 | Tsibulevskiy et al. |
| 2024/0119751 | A1 | 4/2024 | Gardner et al. |

OTHER PUBLICATIONS

Moon, Y., Lee, J., Mun, D., & Lim, S. (2021). Deep learning-based method to recognize line objects and flow arrows from image-format piping and instrumentation diagrams for digitization. Applied sciences, 11(21), 10054. (Year: 2021).*

K. Duan, S. Bai, L. Xie, H. Qi, Q. Huang and Q. Tian, "CenterNet: Keypoint Triplets for Object Detection," 2019 IEEE/CVF International Conference on Computer Vision (ICCV), Seoul, Korea (South), 2019, pp. 6568-6577 (Year: 2019).*

Tan, W. C., Chen, I. M., Pan, S. J., & Tan, H. K. (Aug. 2016). Automated design evaluation on layout of piping and instrumentation diagram using histogram of connectivity. In 2016 IEEE International Conference on Automation Science and Engineering (CASE) (pp. 1295-1300). IEEE. (Year: 2016).*

Bunke, Horst, "Automatic Interpretation of Lines and Text in Circuit Diagrams," J. Kittler, K. S. Fu, and L. F. Pau (editors), D. Reidel Publishing Company, Pattern Recognition Theory and Applications, 1982, pp. 297-310.

Duda, Richard O., et al., "Use of the Hough Transformation to Detect Lines and Curves in Pictures," Association of Computing Machinery, Inc., Graphics and Image Processing, Communications of the ACM, vol. 15, No. 1, Jan. 1972, pp. 11-15.

"European Search Report and Written Opinion," European Application No. 21 150 316.4-1207, Applicant: Bentley Systems, Incorporated, Date of Mailing: Jun. 8, 2021, pp. 1-10.

"European Search Report and Written Opinion," European Application No. 21 150 319.8-1207, Applicant: Bentley Systems, Incorporated, Date of Mailing: Jun. 9, 2021, pp. 1-8.

Julca-Aguilar, Frank D., et al., "Symbol Detection in Online Handwritten Graphics Using Faster R-CNN," IEEE, 2018 13th IAPR International Workshop on Document Analysis Systems, Apr. 24, 2018, pp. 151-156.

Mani, Shouvik, et al., "Automatic Digitization of Engineering Diagrams using Deep Learning and Graph Search," IEEE, 2020 IEEE/CVF Conference on Computer Vision and Pattern Recognition Workshops (CVPRW), Jun. 14, 2020, pp. 673-679.

Moon, Yoochan, et al., "Deep Learning-Based Method to Recognize Line Objects and Flow Arrows from Image-Format Piping and Instrumentation Diagrams for Digitization," MDPI, Applied Sciences, vol. 11, No. 10054, Oct. 27, 2021, pp. 1-21.

Moreno-Garcia, et al., "New Trends on Digitisation of Complex Engineering Drawings," Springer, Neural Computing and Applications, vol. 31, Jun. 13, 2018, pp. 1695-1712.

Paliwal, Shubham, et al., "Digitize-PID: Automatic Digitization of Piping and Instrumentation Diagrams," arXiv, arXiv: 2109.03794v1 [cs.CV], Sep. 8, 2021, pp. 1-13.

Rezvanifar, Alireza, et al., "Symbol Spotting on Digital Architectural Floor Plans Using A Deep Learning-Based Framework," IEEE, 2020 IEEE/CVF Conference on Computer Vision and Pattern Recognition Workshops (CVPRW), Jun. 14, 2020, pp. 2419-2428.

U.S. Appl. No. 17/034,844, filed Sep. 28, 2020 by Marc-André Lapointe, et al. for Classifying Individual Elements of an Infrastructure Model, pp. 1-27.

U.S. Appl. No. 17/128,912, filed Dec. 21, 2020 by Karl-Alexandre Jahjah, et al. for Techniques for Labeling, Reviewing and Correcting Label Predictions for P&IDS, pp. 1-44.

U.S. Appl. No. 17/129,205, filed Dec. 21, 2020 by Marc-André Lapointe, et al. for Techniques for Extracting Machine-Readable Information From P&IDS, pp. 1-29.

Yu, Eun-seop, et al., "Features Recognition from Piping and Instrumentation Diagrams in Image Format Using a Deep Learning Network," MDPI, Engines, vol. 12, No. 4425, Nov. 21, 2019, pp. 1-19.

Zhou, Xingyi, et al., "Objects as Points," arXiv, arXiv: 1904.07850v2 [cs.CV], Apr. 25, 2019, pp. 1-12.

Adam, S., et al., "Symbol and Character Recognition: Application to engineering Drawings," Springer-Verlag 2000, International Journal on Document Analysis and Recognition, IJDAR, vol. 3, Dec. 2000, pp. 89-101.

Ghadekar, Premanand, et al., "Automatic Digitization of Engineering Diagrams Using Intelligent Algorithms," Science Publications, Journal of Computer Science, vol. 17, No. 9, Sep. 28, 2021, pp. 848-854.

Kang, Sung-O, et al., "A Digitization and Conversion Tool for Imaged Drawings to Intelligent Piping and Instrumentation Diagrams (P&ID)," MDPI, Energies, vol. 12, No. 2593, Jul. 5, 2019, pp. 1-26.

(56) References Cited

OTHER PUBLICATIONS

Kim, Byung Chui, et al., "End-to-End Digitization of Image Format Piping and Instrumentation Diagrams at an Industrially Applicable Level," Oxford University Press, Oxford, CDE, Journal of Computational Design and engineering, vol. 9, No. 4, Aug. 2022, pp. 1298-1326.

Llados, Josep, et al., "Symbol Recognition: Current Advances and Perspectives," Springer-Verlag Berlin Heidelberg, GREC 2002, Graphics Recognition Algorithms and Applications, LNCS, Lecture Notes in Computer Science, vol. 2390, Jan. 1, 2002, pp. 104-128.

Rahul, Rohit, et al., "Automatic Information Extraction from Piping and Instrumentation Diagrams," arXiv, arXiv:1901.11383v1 [cs.CV], Jan. 28, 2019, pp. 1-10.

U.S. Appl. No. 19/092,793, filed Mar. 27, 2025 by Marc-André Gardner, et al. for Techniques for Extracting Associations in Schematic Diagrams, pp. 1-38.

\* cited by examiner

TECHNIQUES FOR EXTRACTING LINKS AND CONNECTIVITY FROM SCHEMATIC DIAGRAMS

BACKGROUND

Technical Field

The present disclosure relates generally to extracting machine-readable information from schematic diagrams in image-only formats and more specifically to techniques for extracting links and connectivity from schematic diagrams in image-only formats.

Background Information

A number of engineering fields utilize schematic diagrams. In contrast to a physical drawings that depicts the specific location, size and shape of components, a schematic diagram conveys information independent of location, size and shape, focusing instead on function and process. In the field of infrastructure design and maintenance, a common type of schematic diagram is a piping and instrumentation diagram (P&ID). FIG. 1 is a view of a portion of an example P&ID 100. The P&ID includes symbols 110 which represent physical components (e.g., valves, pumps, vessels, instruments, etc.) or abstractions (e.g., off-page references), links 130 which represent connections (e.g., pipes, electrical wires, etc.) between the physical components or abstractions, tags 120 which provide descriptions (e.g., names, codes, properties, etc.) of the symbols and links, as well as other text regions (e.g., title blocks, legends, notes, etc.) (not shown).

A typical engineering project (e.g., infrastructure project) may have hundreds of related schematic diagrams (e.g., P&IDs) that have been created over the course of many years. These schematic diagrams often may only be available in an image-only format (e.g., as a JPG, PNG, BMP, TIFF, PDF, etc.) that lacks machine-readable information defining the symbols, links, and text boxes shown in the diagram. Sometimes, the image-only schematic diagram originated from a scan of a printed document and is of fairly low quality, having low resolution and/or including visual artifacts, obscured or blurry portions and the like.

In an image-only format, information in a schematic diagram is hard to validate and difficult to consume. There is an increasing desire to create digital twins, and the information in schematic diagrams is often useful in creating such representations. However, as the information in an image-only format is largely inaccessible to design and modeling software applications, obtaining such information has often involved lengthy manual review and data entry. Even updating a schematic diagram itself is difficult with an image-only format.

Some effective techniques have been proposed for extracting symbols, their properties, and related tags from schematic diagrams in image-only formats. These include machine learning (ML) techniques that utilize trained ML models to extract symbols and properties and optical character recognition (OCR) algorithms to determine tags for the symbols. However, the links and connectivity in schematic diagrams have received less attention, and there is still an unmet need for effective techniques to extract such information.

Links are typically depicted as line segments in schematic diagrams (e.g., P&IDs). However, traditional line detection techniques, including signal processing approaches, filtering based approaches, morphological approaches, vectorizing approaches, and graph based approaches, often fail to provide adequate results in the context of schematic diagrams. Extracting links and connectivity in schematic diagrams introduces special challenges not found in many other types of line detection tasks. For example, not all lines in schematic diagrams are links. Many components have symbols that contain long line segments. However, such line segments do not represent links. Further, some links may not be continuous lines. Some links may be represented by dashed lines or may be interrupted by a tag or other portion of the diagram (e.g. "disappearing" beneath it and "reappearing" on the other side). Scanning artifacts and other sources or noise may also introduce discontinuities. Still further, some links may not be perfectly horizontal or vertical. There may be diagonal links or the entire schematic diagram may be tilted slightly due to page-skew during scanning. Likewise, all intersections of lines do not necessarily represent connectivity. In schematic diagrams, there are typically both junctions and crossings. A junction is where two links actually connect together. A crossing is where two links simply cross to permit illustration in the schematic diagram (e.g., due the two-dimensional (2D) nature of the schematic diagram) and do not imply anything about the underlying function or process it describes. There may be visual clues to differentiate crossings and junctions, for example, a dot when the intersection is a junction or a small arc or line gap when the intersection is a crossing. However, such visual clues regarding connectivity typically have no meaning to traditional line detection techniques. Moreover, there generally no official standards for those visual cues, so different sources of documents (e.g., different companies) may use different representations.

Accordingly, there is a need for improved techniques for extracting links and connectivity from schematic diagrams (e.g., P&IDs) in image-only formats.

SUMMARY

In various embodiments, techniques are provided for using combination of multiple ML models and signal processing to extract links and connectivity from a schematic diagram in an image-only format. A first ML model (referred to herein as a "link segmenter") may produce a first set of predictions about the positions of link segments in the schematic diagram (e.g., creating a segmentation map). A second ML model (referred to herein as a "keypoint detector") may produce a second set of predictions about starting and stopping points of link segments in the schematic diagram (e.g., creating one or more heatmaps). A signal processing module may combine the first set of predictions about the positions of link segments and the second set of predictions about starting and stopping points of link segments to produce a description of links and connectivity they provide (e.g., combining the segmentation map with data from the one or more heatmaps to produce a graph connectivity matrix). Since each set of predictions is the result of a ML model, it may include some mistakes. However, the two sets of predictions are extremely unlikely to include the same mistakes and thereby combination may improve accuracy dramatically.

In one specific embodiment, a schematic diagram data extraction application extracts links and connectivity from a schematic diagram in an image-only format. It uses a first ML model (i.e. link segmenter) to produce a first set of predictions about the positions of link segments in the schematic diagram. It uses a second ML model (i.e. keypoint detector) to produce a second set of predictions about starting and stopping points of link segments in the schematic diagram. It uses a signal processing module to combine the first set of predictions about the positions of link segments and the second set of predictions about starting and stopping points of link segments to produce a description of links and connectivity they provide between symbols in the schematic diagram and then outputs the description of links and connectivity in a machine-readable format.

It should be understood that a variety of additional features and alternative embodiments may be implemented other than those discussed in this Summary. This Summary is intended simply as a brief introduction to the reader for the further description that follows and does not indicate or imply that the examples mentioned herein cover all aspects of the disclosure or are necessary or essential aspects of the disclosure.

BRIEF DESCRIPTION OF THE DRAWINGS

The description refers to the accompanying drawings of example embodiments, of which.

DETAILED DESCRIPTION

Definitions

Figure 1:
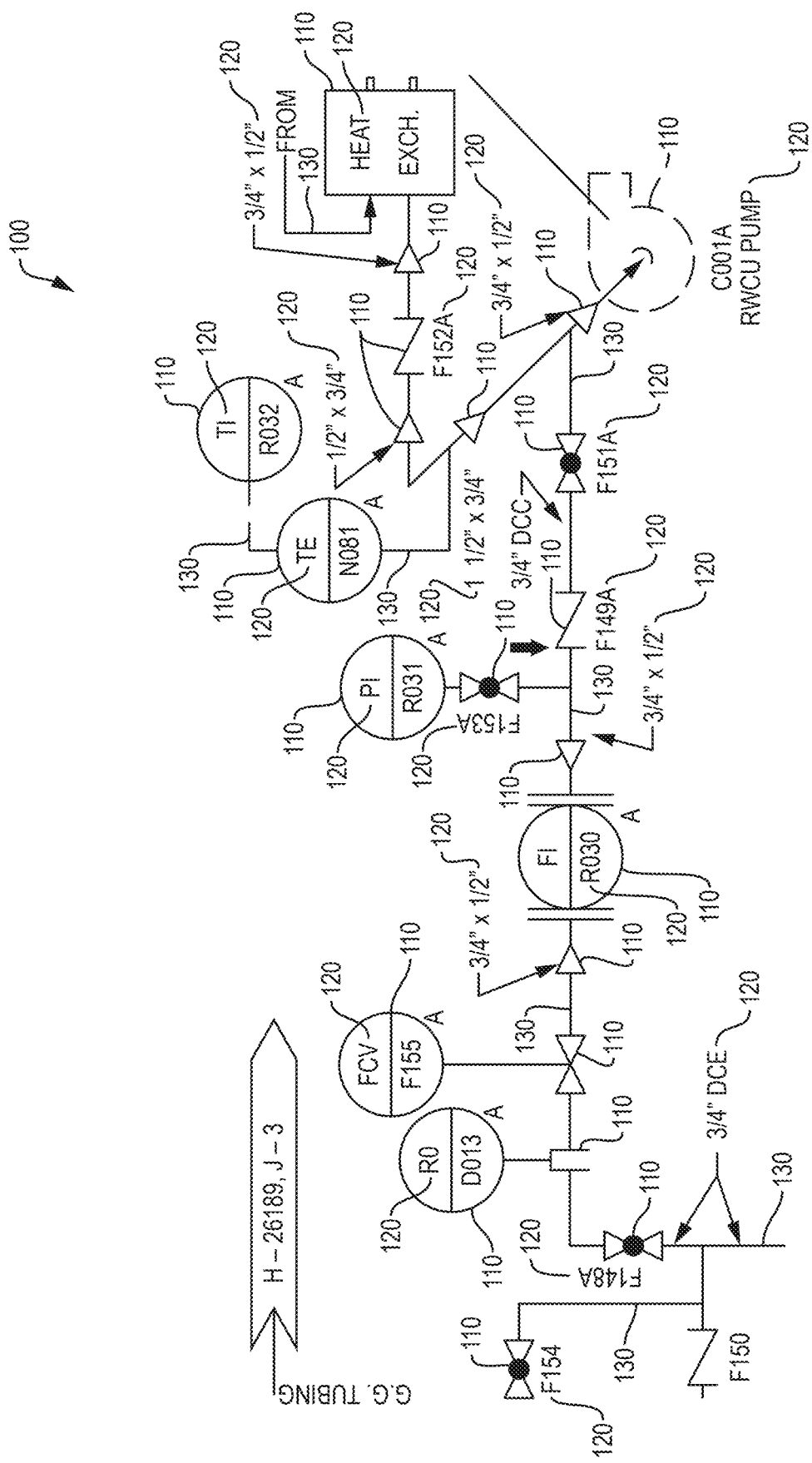
FIG. 1 is a view of a portion of an example P&ID.

As used herein, the term "symbol" refers to a graphical representation of either a physical component (e.g., valve, pump, vessel, instrument, etc.) or an abstraction (e.g., an off-page reference) that can be connected to one or more links in a schematic diagram (e.g., a P&ID).

As used herein, the term "link" refers to a connection in a schematic diagram (e.g., a P&ID) between two or more symbols. A link is typically composed of one or more line segments (referred to as "link segments") that are coupled together without going through a symbol.

As used herein, the term "link segment" refers to a line segment which is part of a link. The line segment is typically straight, though it may be disposed in any direction (e.g., horizonal, vertical, diagonal, etc.)

As used herein, the term "link type" refers to a category or class of a link that generally identifies the connection function it provides. Examples of link types may include process, electrical, data, pneumatic, hydraulic, etc., with the exact types depending on the specific schematic diagram. In some cases, link types are graphically indicated by the visual appearance (line style, weight, etc.) of the one or more line segments depicting the link in the schematic diagram.

As used herein, the term "text region" refers to a portion of a schematic diagram (e.g., a P&ID) that includes text (e.g., a tag, title block, legend, note, etc.). A schematic diagram may generally be divided into text regions and non-text regions.

As used herein the term "tag" refers to a specific type of text region associated with a symbol or link that includes a set of letters and/or numbers that identify the component, abstraction or connection. Typically, a tag conveys information about the type, parameters and/or function of the component, abstraction or connection.

As used herein, the term "connection point" refers to a point in a schematic diagram where a link segment starts or stops. A connection point may be an "associated connection point" or a "floating connection point."

As used herein, the term "associated connection point" refers to a connection point where a link segment meets an input or output of a symbol. The connection point does not simply start or stop the link segment, but rather the entire link to which the link segment belongs.

As used herein, the term "floating connection point" refers to a connection point where a link segment meets another link segment to form a larger link. The link segments may meet at the connection point with an elbow, a T-connection, a 4-way connection, or other type of connection.

As used herein, the term "graph connectivity matrix" refers to a matrix that indicates, for each symbol in a schematic diagram (e.g., P&ID), which other symbols it is connected to by a link. In some cases, the graph connectivity matrix is a size N×N matrix, where N is the number of symbols in the schematic diagram, and where a first value (e.g. "1") at an intersection (i, j) indicates that symbol #i and symbol #j are connected through a link, and a second value (e.g., "0") at the intersection indicates they are not. In such cases, by definition, the diagonal of the matrix would be filled entirely by the first value (e.g., "1") since all symbols are inherently connected to themselves.

Example Embodiments

Figure 2:
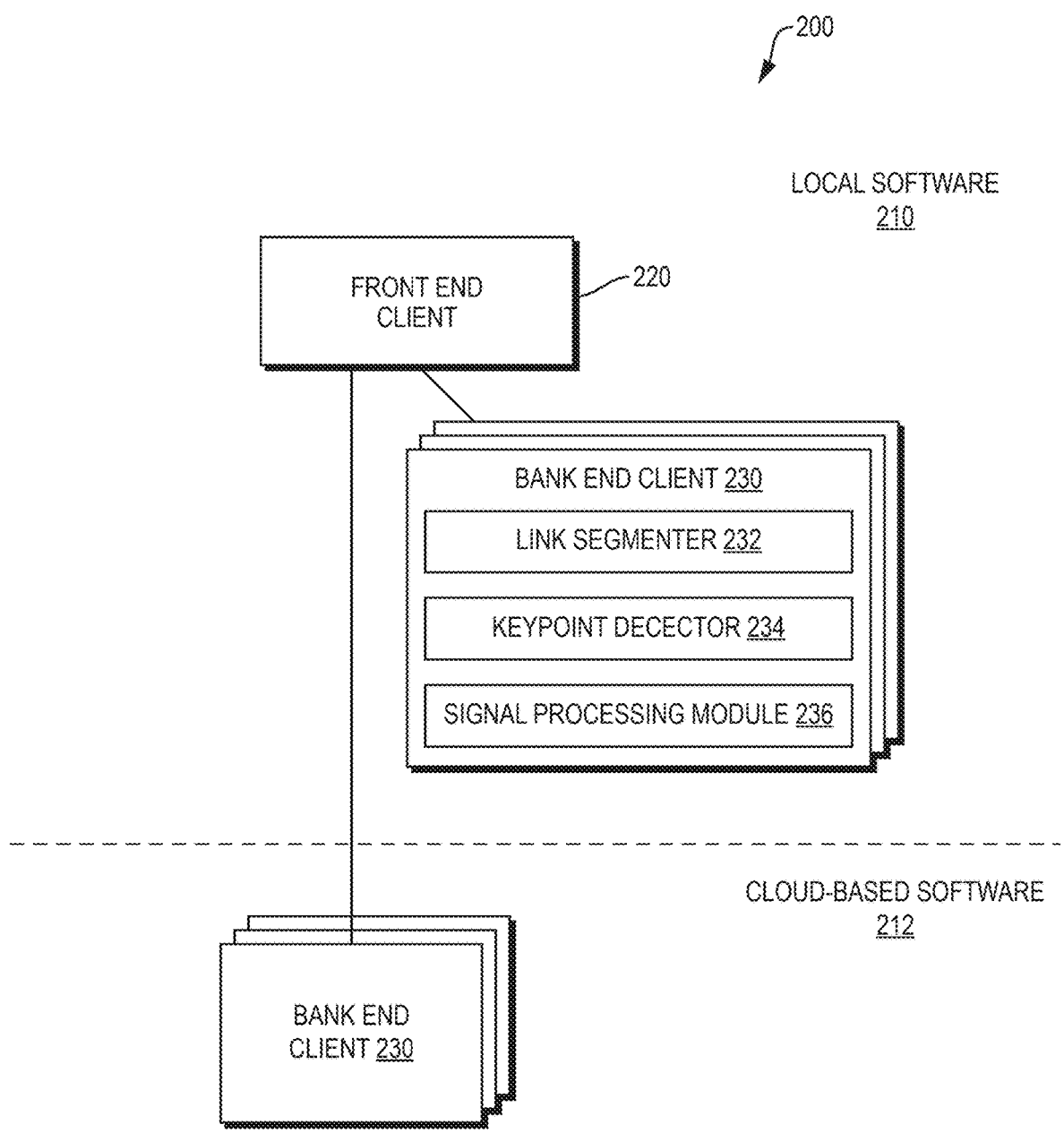
FIG. 2 is a high-level block diagram of an example schematic diagram data extraction application.

FIG. 2 is a high-level block diagram of an example schematic diagram data extraction application. The schematic diagram data extraction application 200 may be a stand-alone software application or a component of a larger software application, for example, a design and modeling software application. The software may be divided into local software 210 that executes on one or more computing devices local to an end-user (collectively "local devices") and, in some cases, cloud-based software 212 that is executed on one or more computing devices remote from the end-user (collectively "cloud computing devices") accessible via a network (e.g., the Internet). Each computing device may include processors, memory/storage, a display screen, and other hardware (not shown) for executing software, storing data and/or displaying information. The local software 210 may include a frontend client 220 and one or more backend clients 230 operating on a local device. The cloud-based software 212 may include, in some cases, one or more backend clients 230 operating on cloud computing devices. The frontend client 220 may provide user interface functionality as well as perform certain non-processing intensive operations. The backend client(s) 230 may perform more processing intensive operations (e.g., ML operations, signal processing operations, etc.). To that end, the backend clients 230 may include a first ML model (i.e. link segmenter) 232 adapted to predict the position of link segments in a schematic diagram, a second ML model (i.e. keypoint detector) 234 adapted to predict starting and stopping points of link segments in the schematic diagram and a signal processing module 236 adapted to combine the first set of predictions and the second set of predictions to produce a description of links and connectivity they provide in the schematic diagram. While the link segmenter 232, keypoint detector 234, and signal processing module 236 are shown as part of a backend client 230 of the local software 210, it should be understood some or all of this software may alternatively be part of a backend client 230 of the cloud-based software 212.

Figure 3:
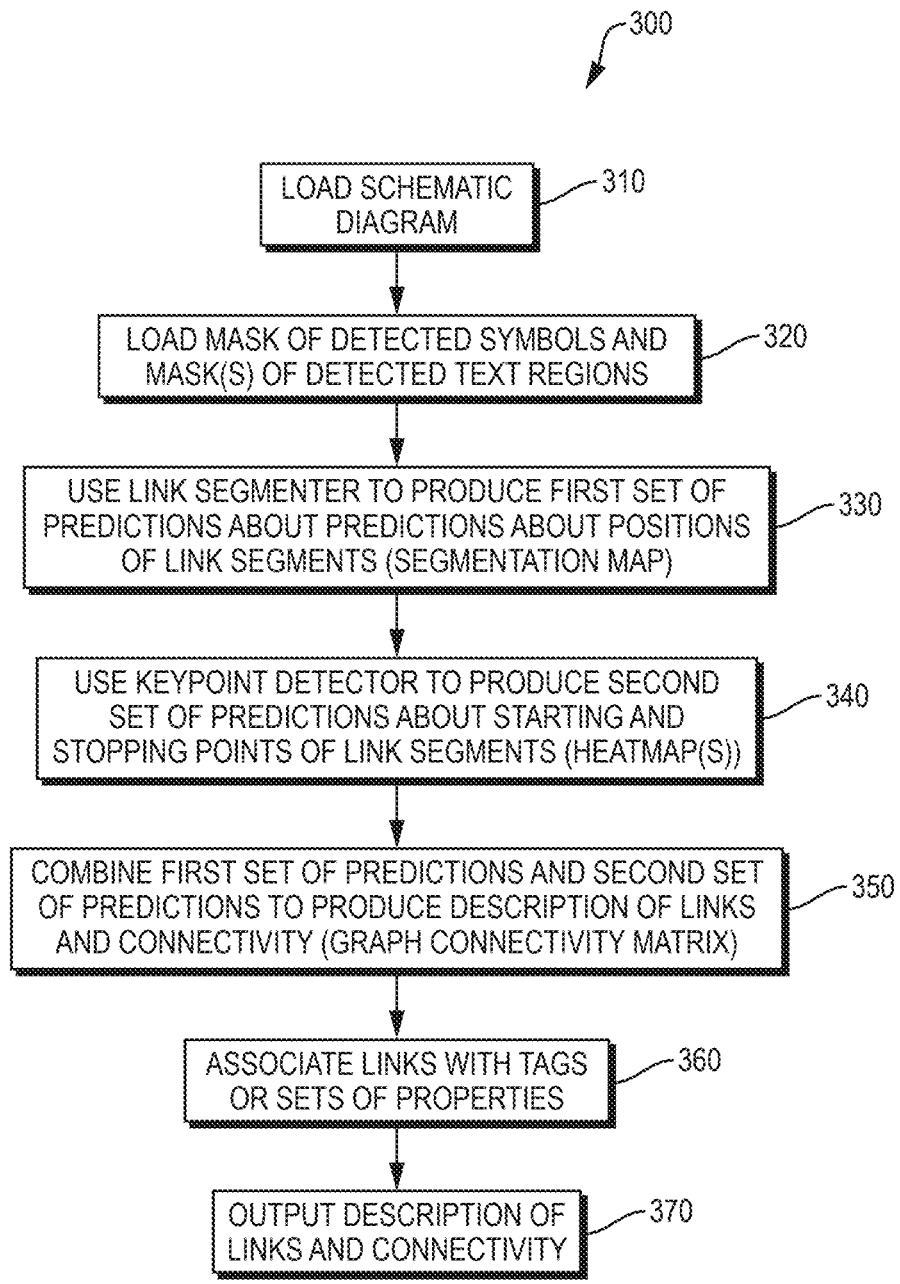
FIG. 3 is an example sequence of steps that may be performed by the schematic diagram data extraction application using a link segmenter, a keypoint detector, and a signal processing module to extract links and connectivity from a schematic diagram in an image-only format.

FIG. 3 is an example sequence of steps 300 that may be performed by the schematic diagram data extraction application 200 using the link segmenter 232, keypoint detector 234, and signal processing module 236 to extract links and connectivity from a schematic diagram in an image-only format. At step 310, the schematic diagram data extraction application 200 loads the schematic diagram. Its image-only format may be a JPG, PNG, BMP, TIFF, PDF, etc. Image size may be variable. In some cases, the schematic diagram may be obtained from a scan of a printed document. An example schematic diagram (here a P&ID 100) that may be loaded as part of step 310 is shown in FIG. 1.

At step 320, the schematic diagram data extraction application 200 loads a mask of detected symbols in the schematic diagram and one or more masks of detected text regions in the schematic diagram. The masks may include a value for each position (e.g. pixel) in the schematic diagram that indicates whether it belongs to a symbol/text region (e.g., 1) or not (e.g., 0). The masks may be stored in JavaScript Object Notation (JSON) files. In some cases, the masks may be produced by a separate ML-based symbol detection workflow. One example ML-based symbol detection workflow that may be used to produce such masks is described in U.S. patent application Ser. No. 17/129,205, titled "Techniques for Extracting Machine-Readable Information from P&IDs," filed Dec. 21, 2020, the contents of which are incorporated by reference herein. Where a separate ML-based symbol detection workflow is used, the masks may contain some errors.

At step 330, the schematic diagram data extraction application 200 uses the link segmenter 232 to produce a first set of predictions about the positions of link segments in the schematic diagram. The first set of predictions may take the form of a segmentation map that for each position (e.g., pixel) in the schematic diagram indicates a probability that the position is part of a link. Each probability may be represented as a value between 0 and 1, with 0 indicating the link segmenter 232 is absolutely sure the position (e.g., pixel) is not part of a link and 1 indicating the link segmenter 232 is absolutely sure the position (e.g., pixel) is part of a link. The segmentation map may be maintained in a lossless graphics file (e.g., a 16-bit PNG) that preserves the dynamic range of the predicted probabilities.

Figure 4A:
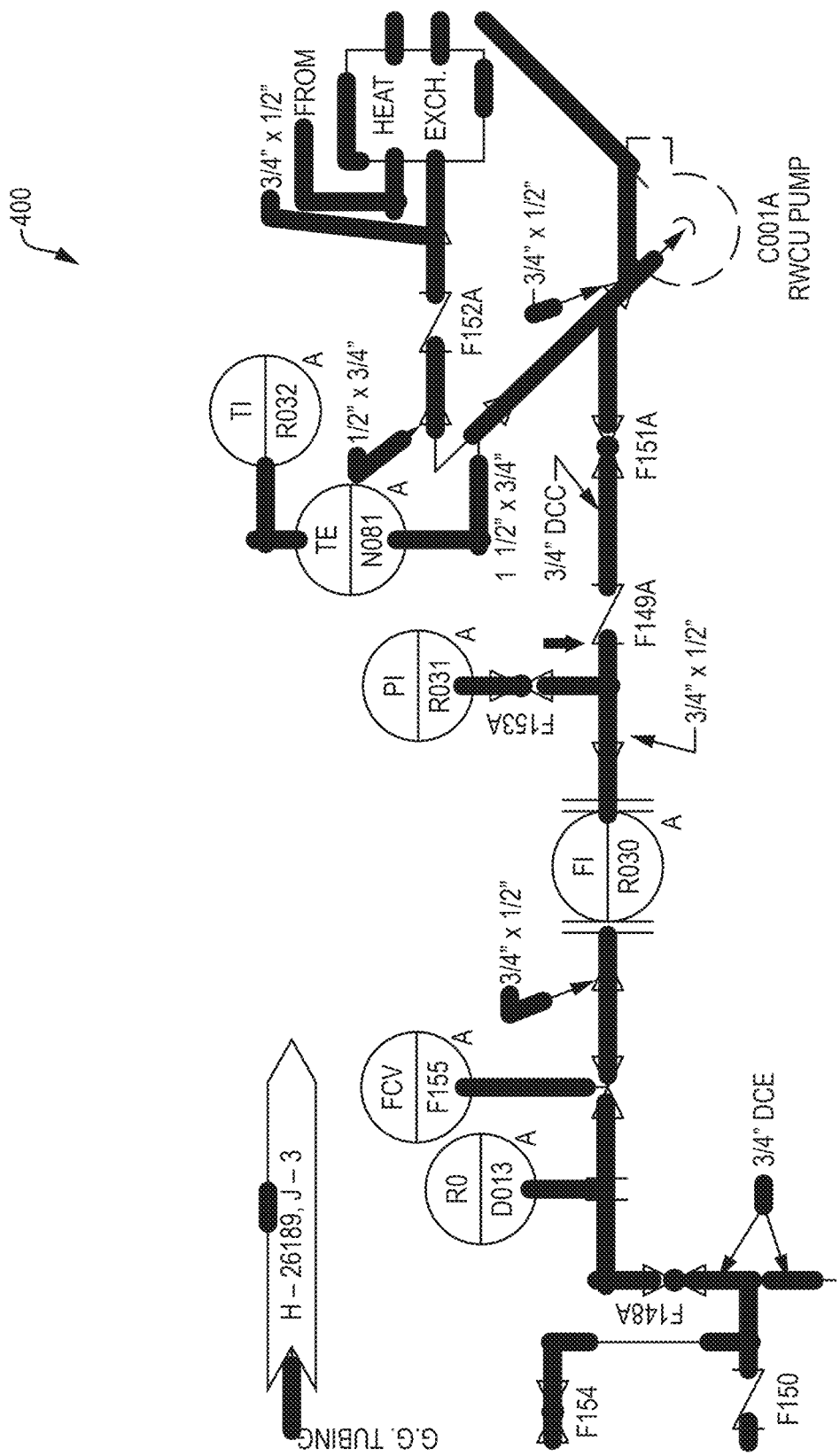
FIG. 4A is a visualization of a portion of an example segmentation map for an example P&ID.
Figure 4B:
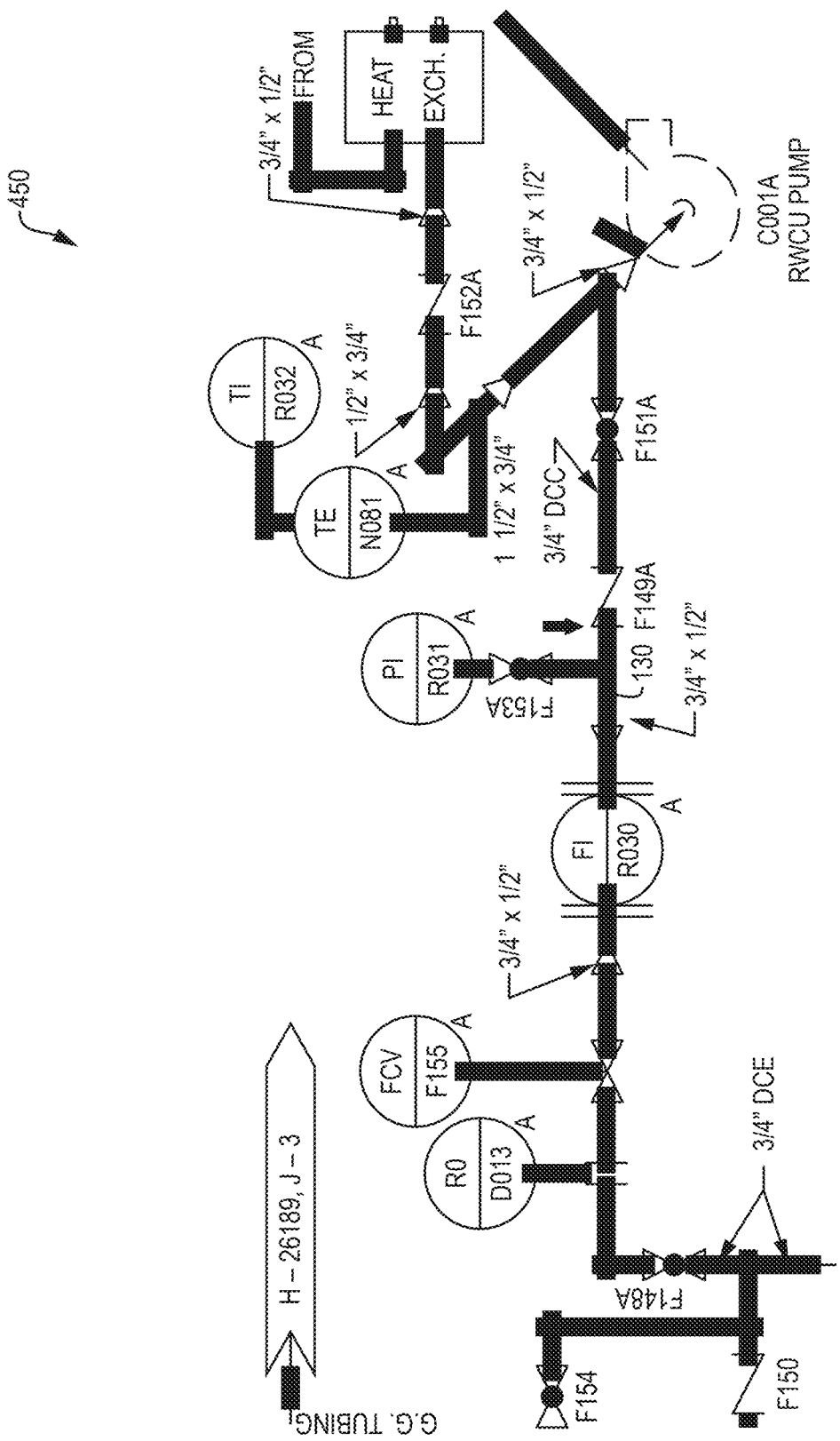
FIG. 4B is a visualization of a portion of example ground truth for the positions of link segments for the same P&ID as FIG. 4A, that may be used in training the link segmenter to produce the segmentation map.

The goal of step 330 is to extract link segments, but not necessarily determine their connectivity to each other and symbols. FIG. 4A is a visualization 400 of a portion of an example segmentation map for an example P&ID. To facilitate visualization, the segmentation map may be binarized by applying a threshold (e.g., at 0.5) to distinguish between predicted link and non-link positions (e.g., pixels). FIG. 4B is a visualization 450 of a portion of example ground truth for the positions of link segments for the same P&ID as FIG. 4A, that may be used in training the link segmenter 232 to produce the segmentation map.

While the examples above contemplate differentiating between link and non-link positions (e.g., pixels), in some implementations the link segmenter 232 may be trained to also predict a link type (e.g., process, electrical, data, pneumatic, hydraulic, etc.) of link segments based on the visual appearance of the line segment depicting the link segment, and thereby may differentiate between positions (e.g., pixels) of each link type. In such implementations, the segmentation map may include multiple probabilities for each position (e.g., pixel) the indicate a probability it is part of a link of a given link type. The predominant link type of the positions (e.g., pixels) that make up a link segment may be associated with the entire link segment, and ultimately the predominate link type of all the link segments that make up a link may be associated with the link.

Further, in some implementations, the link segmenter 232 may be trained to also predict a flow direction of link segments based on the type of line ending (e.g., arrow) associated with the line segment. In such implementations, the segmentation map may be expanded to also include flow direction data. Ultimately the predominate flow direction of all the link segments that make up a link may be associated with the link.

Figure 5:
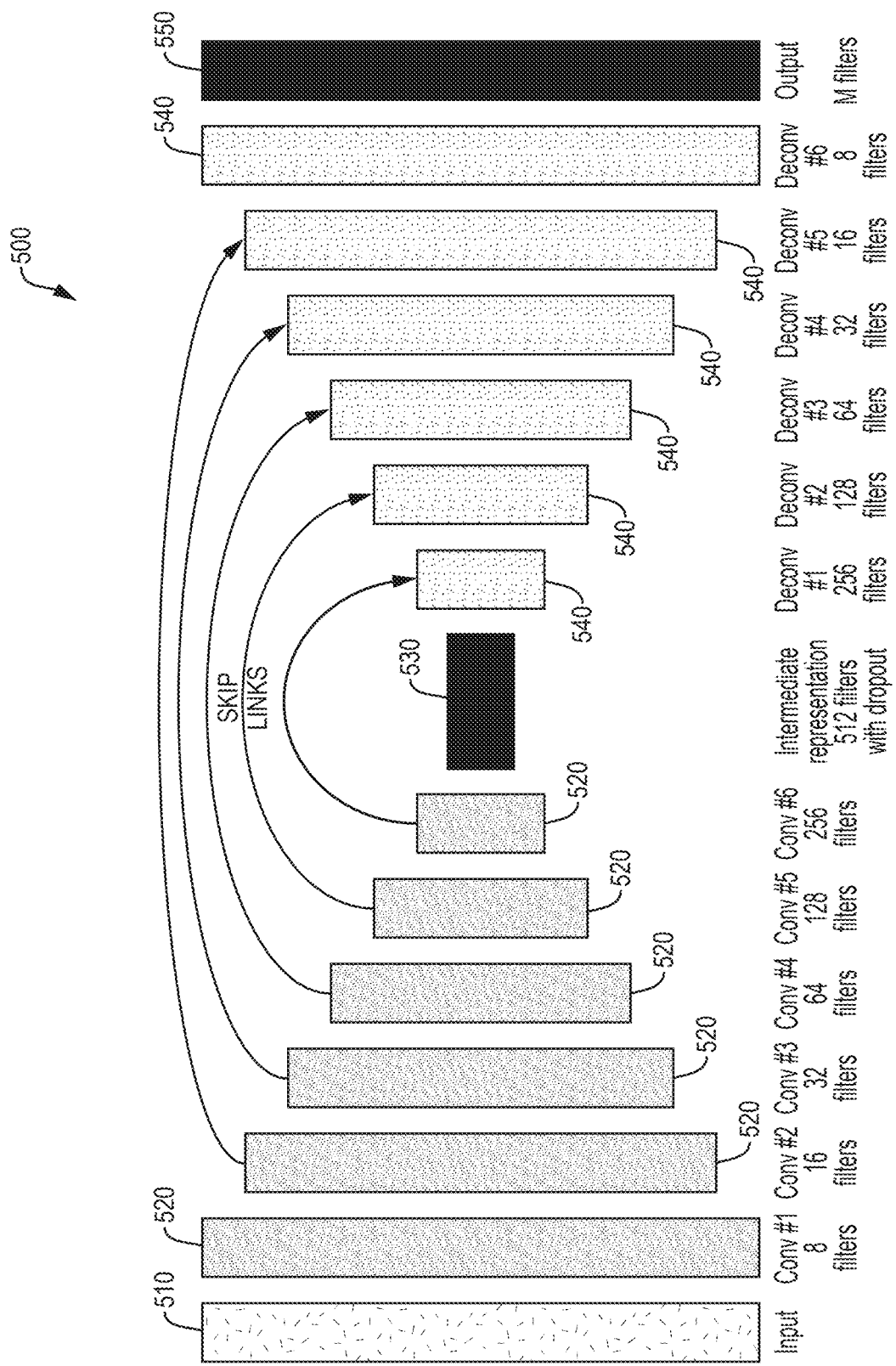
FIG. 5 is a block diagram of an example modified U-Net architecture that may be used for the link segmenter.

The link segmenter 232 that produces the first set of predictions about the positions of link segments (e.g., the segmentation map) may be structured according to a convolutional neural network architecture adapted for semantic segmentation. In one implementation, the convolutional neural network architecture is a modified U-Net architecture. FIG. 5 is a block diagram of an example modified U-Net architecture 500 that may be used for the link segmenter 232. The architecture 500 includes an input layer 510 that consumes the schematic diagram loaded in step 310, and the mask of detected symbols in the schematic diagram loaded in step 320. A plurality (e.g., 6) convolution layers (encoder layers) include increasing numbers of filters (e.g., 8, 16, 32, 64, 128 and 256 filters respectively). These may be coupled via a bottleneck layer (intermediate representation) 530 to a plurality (e.g., 6) deconvolution layers (decoder layers), as well as via a number of skip links from respective convolution layers (encoder layers) 520. The bottleneck layer (intermediate representation) 530 may include a feature alpha dropout layer that randomly drops out entire feature maps. Each the deconvolution layers (decoder layers) may include a bilinear upscaling layer, a padding layer, a convolution layer with decreasing numbers of filter (e.g., 256, 128, 64, 32, 16 and 8 filters respectively) and a scaled exponential linear unit (SeLU) activation layer to avoid artifacts at the position (e.g., pixel) level in the output. The architecture 500 includes an output layer 550 that provides a segmentation map with a configurable number of channels. In implementations where there a multiple channels, each channel may correspond to a different link type, flow direction, or other quality to be extracted. A binary cross-entropy loss function may be used that is heavily weighted (e.g., 20×) towards foreground classes (classes of link segments) over a background class (a non-link segment class). Since there are typically many more background than foreground positions (e.g., pixels) in a schematic diagram, this heavy weighting may force the link segmenter 232 to learn link segments. A link segmenter 232 constructed according to the architecture 500 may be trained on manually labeled examples over a number of epochs (e.g., 50 epochs) and the model with the best validation performance selected and used in the sequence of steps 300.

At step 340, the schematic diagram data extraction application 200 uses the keypoint detector 234 to produce a second set of predictions about starting and stopping points of link segments in the schematic diagram. The second set of predictions may be based on one or more heatmaps that for each position (e.g., pixel) in the schematic diagram indicates a probability the position is a connection point. In each heatmap, probability may be represented as a value between 0 and 1, with 0 indicating the keypoint detector 234 is absolutely sure the position (e.g., pixel) is not a connection point and, 1 indicating the keypoint detector 234 is absolutely sure the position (e.g., pixel) is a connection point. The second set of predictions may include the locations of peaks of such heatmaps together with one or more attributes, and be maintained in a JSON file.

Figure 6A:
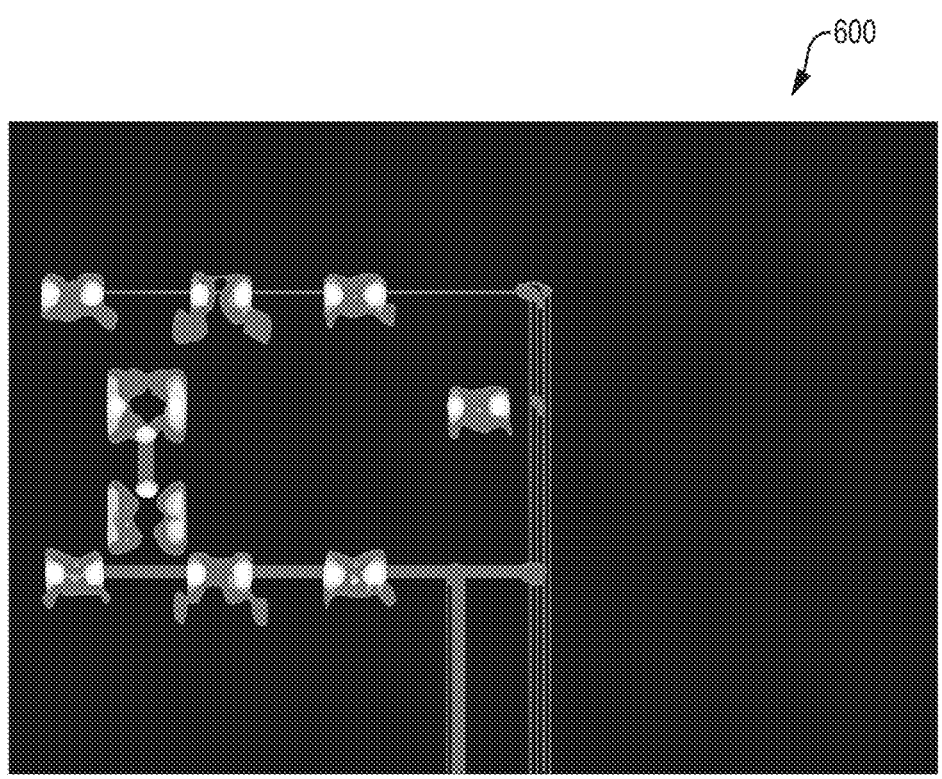
FIG. 6A is a visualization of a portion of an example heatmap for an example P&ID that may be produced using the keypoint detector.
Figure 6B:
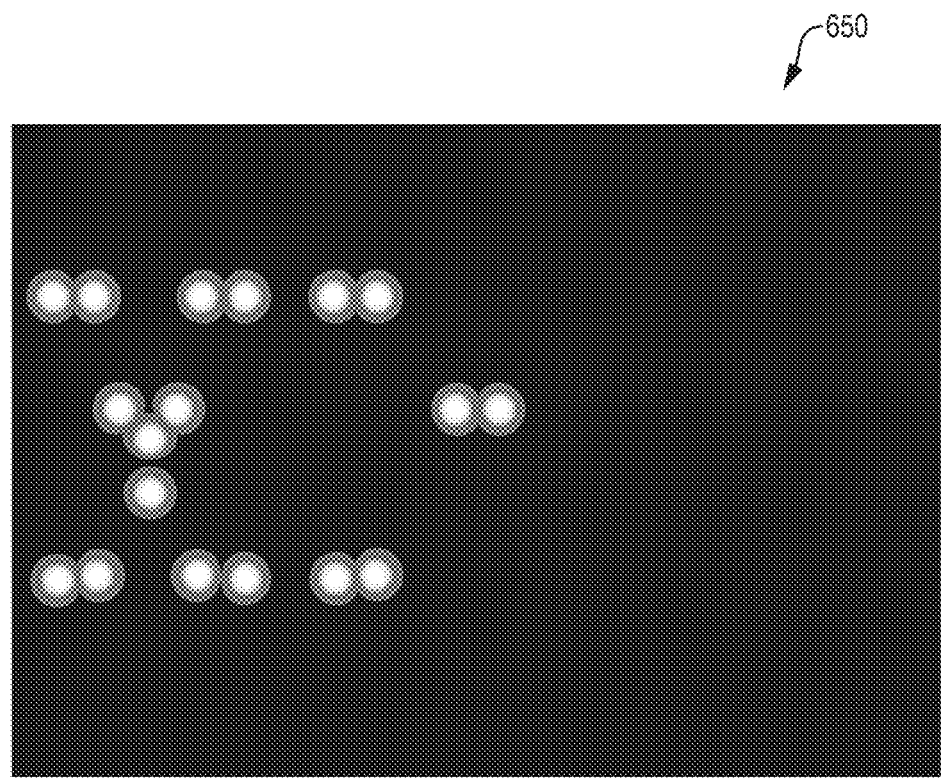
FIG. 6B is a visualization of a portion of example ground truth for starting and stopping points of link segments for the same P&ID as FIG. 6A that may be used in training the keypoint detector.

The goal of step 340 is to extract the connectivity of link segments to each other and symbols in the schematic diagram (e.g., P&ID) as a set of discrete points. A point where a line segment touches a symbol or another line segment is not necessarily a connection point (e.g. a lead line of a tag that touches a symbol is not considered to create a connection point). Likewise, a point where a line segment starts or stops is not necessarily a connection point (e.g., in a link segment represented by a dashed line, where each dash starts or stops is not considered to be a connection point). To distinguish connection points from these other cases, the keypoint detector 234 may be trained to learn the very structure of the schematic diagram (e.g., P&ID). FIG. 6A is a visualization 600 of a portion of an example heatmap for an example P&ID that may be produced using the keypoint detector 234. Peaks of the heatmap may represent predicted starting and stopping points of link segments. FIG. 6B is a visualization 650 of a portion of example ground truth for starting and stopping points of link segments for the same P&ID as FIG. 6A that may be used in training the keypoint detector 234. The positions of each connection point in the ground truth may be represented by a two-dimensional (2D) gaussian.

Figure 7:
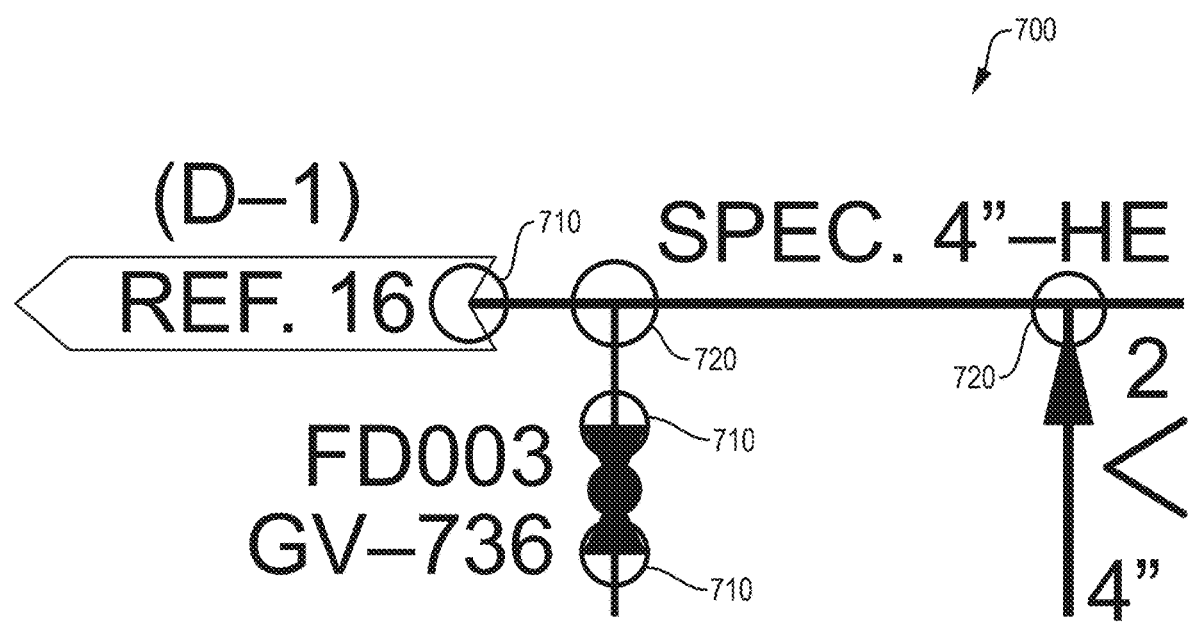
FIG. 7 is a view of a portion of an example P&ID showing associated connection points and floating connection points.

Further, rather than treat all connections points as identical, the keypoint detector 234 may be trained to distinguish between associated connection points (i.e. a connection point where a link segment meets an input or output of a symbol) and floating connection points (i.e. a connection point where a link segment meets another link segment to form a larger link). FIG. 7 is a view 700 of a portion of an example P&ID showing associated connection points 710 and floating connection points 720. In an implementation where the keypoint detector 234 distinguishes between associated connection points and floating connection points, the second set of predictions may take the form of two heatmaps, a first heatmap that for each position (e.g., pixel) in the schematic diagram indicates a probability the position is an associated connection point and a second heatmap that for each position (e.g., pixel) in the schematic diagram indicates a probability the position is an associated connection point.

Figure 8:
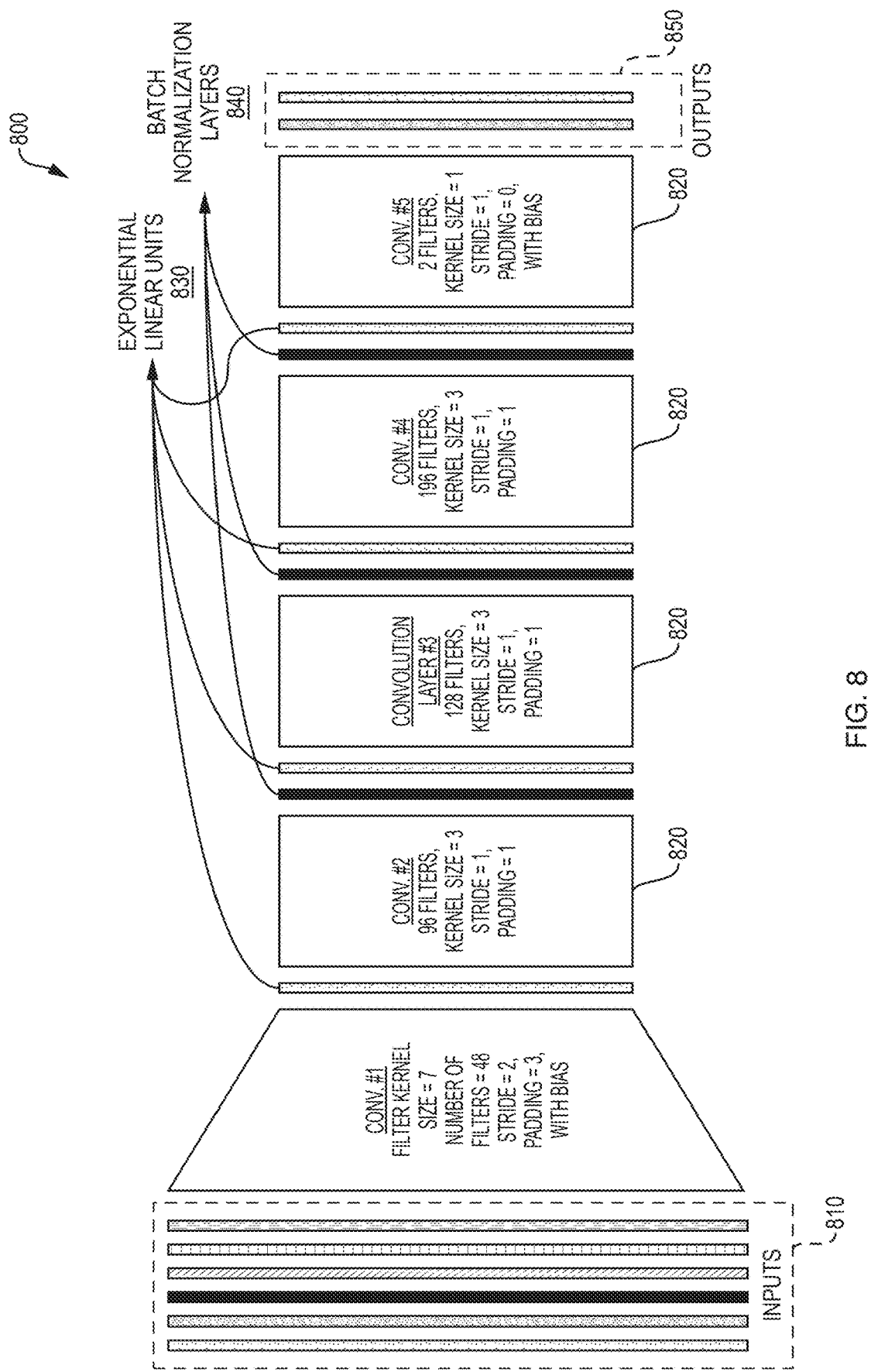
FIG. 8 is a block diagram of an example deep neural network architecture that may be used for the keypoint detector.

The keypoint detector 234 that produces the one or more heatmaps may be structured according to a deep neural network architecture adapted for anchorless object detection. In one implementation the deep neural network architecture may be loosely based on a CenterNet architecture. FIG. 8 is a block diagram of an example deep neural network architecture 800 that may be used for the keypoint detector 234. The architecture 800 includes an input layer 810 that consumes the schematic diagram loaded in step 310, and the mask of detected symbols in the schematic and masks of detected text regions in the schematic diagram (which may be further broken down into a mask of tags and a mask of title blocks, legends, etc.) loaded in step 320. A plurality (e.g., 5) convolution layers 820 are provided that each include a numbers of filter (e.g., 48, 96, 128, 196 and 2 filters, respectively) have varying kernel size (e.g., 7, 3, 3, 3, an 1 kernel size, respectively), use varying stride (e.g., 2, 1, 1, 1, and 1 stride, respectively) and use varying padding (e.g., 3 with bias, 1, 1, 1, and 0 with bias, respectively). The convolution layers 820 are coupled by exponential linear unit (ELU) activation layers 830 and gaussian batch normalization layers 840. Typically, the number of filters in the last layer 820 will equal the number of heatmaps desired, here, two heatmaps. A first heatmap indicates for each position (e.g., pixel) in the schematic diagram a probability the position is an associated connection point. A second heatmap indicates for each position (e.g., pixel) in the schematic diagram a probability the position is an associated connection point. The architecture 800 includes an output layer 850 that provides the two heatmaps.

Figure 9:
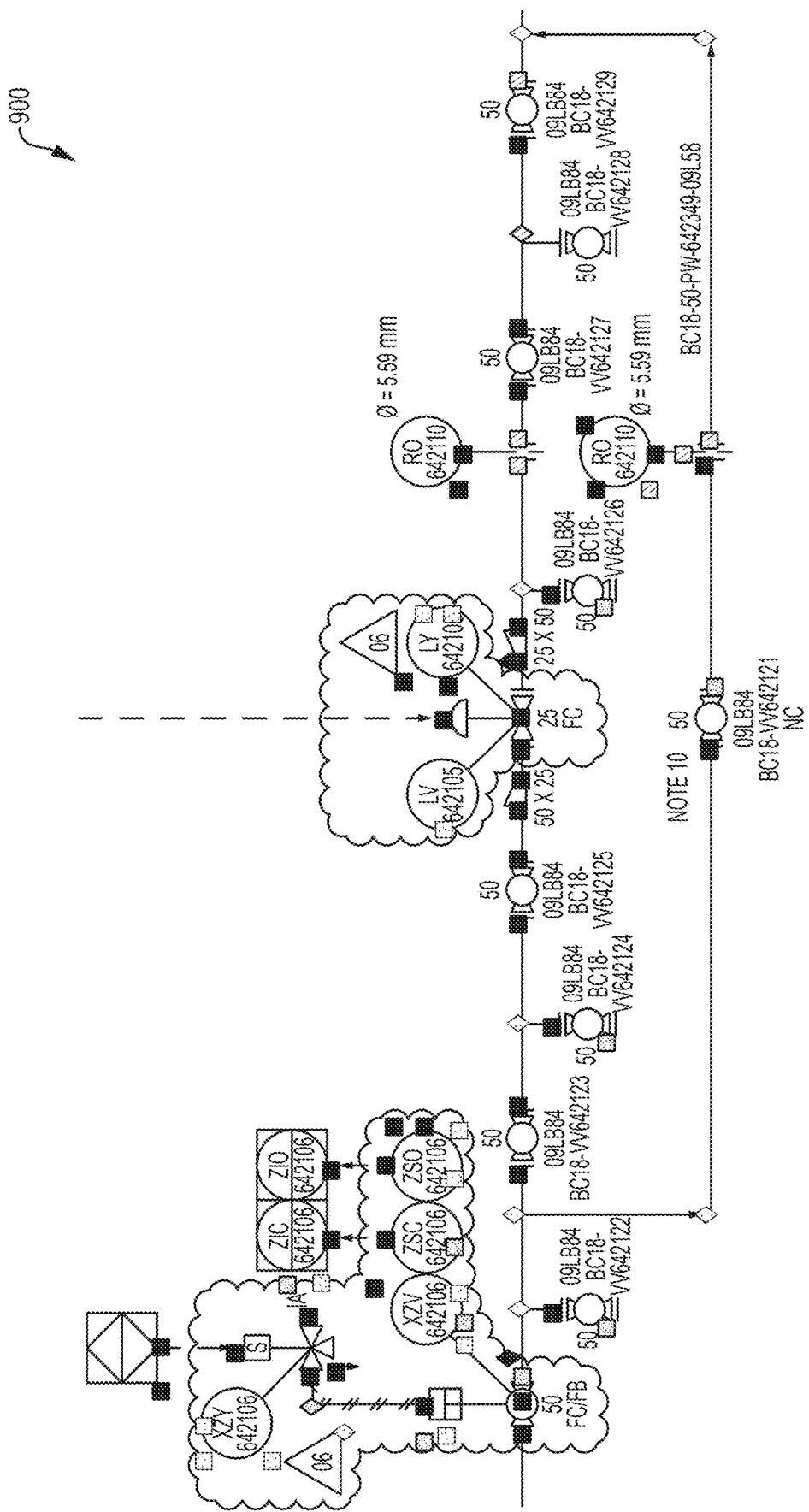
FIG. 9 is a visualization of a portion of an example P&ID showing a second set of predictions about starting and stopping points of link segments.

FIG. 9 is a visualization 900 of a portion of an example P&ID showing a second set of predictions about starting and stopping points of link segments. In this visualization, predicted associated connection points are identified by squares and floating connection points are identified by diamonds. Probability may be indicated by a respective color (not shown).

At step 350, the signal processing module 236 of the schematic diagram data extraction application 200 combines the first set of predictions about the positions of link segments and the second set of predictions about starting and stopping points of link segments to produce a description of links and connectivity they provide. This may involve combining the segmentation map produced in step 330 with data from the one or more heatmaps produced in step 340. Since each set of predictions is the result of a ML model, it may include some mistakes, including false negatives (e.g., missing link segments or connection points) and false positives (e.g., including erroneous link segment or connection points). However, the two sets of predictions are extremely unlikely to include the same mistakes (i.e. mistakes that are logically consistent, such as an erroneous link segment and two coinciding erroneous connection points). Accordingly, their combination improves result accuracy. The results of the combining may be saved as a graph connectivity matrix which indicates, for each symbol in the schematic diagram, which other symbols it is connected to by a link.

Figure 10:
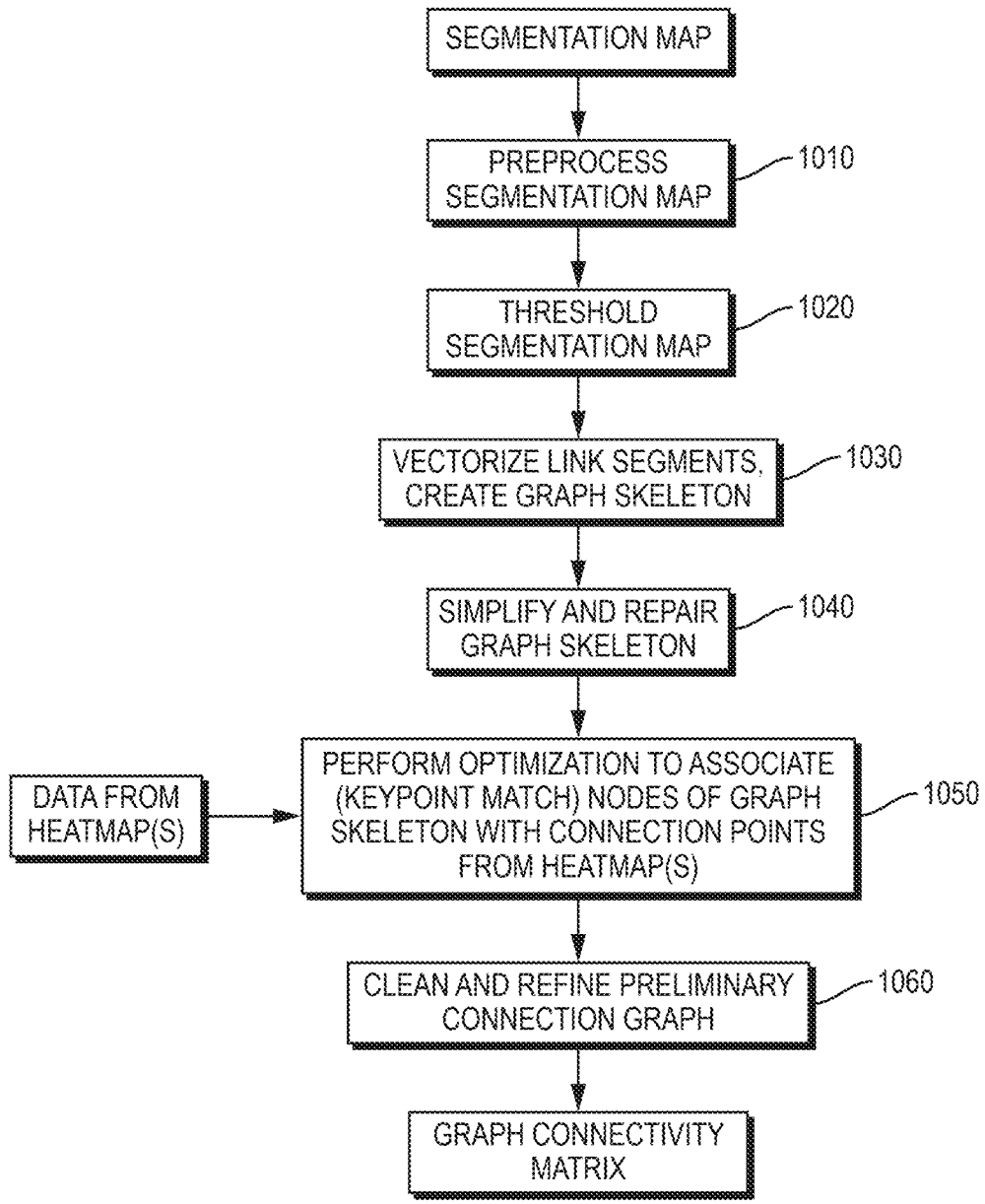
FIG. 10 is an example sequence of sub-steps that may be performed by the signal processing module of the schematic diagram data extraction application as part of a step of FIG. 3.

The signal processing module 236 may perform a number of sub-steps to combine the two sets of predictions. FIG. 10 is an example sequence of sub-steps that may be performed by the signal processing module 236 of the schematic diagram data extraction application 200 as part of step 350 of FIG. 3.

At sub-step 1010, the signal processing module 236 preprocess the segmentation map (e.g., using morphological filtering, low pass filtering, or other techniques) to remove outliers.

At sub-step 1020, the signal processing module 236 thresholds the segmentation map to distinguish between predicted link and non-link positions (e.g., pixels) (e.g., using adaptive thresholding, local thresholding, region growing, hysteresis thresholding, k-means gradient-based-analysis or other techniques). Such thresholding may be akin to the binarization discussed above in the context of visualization.

Figure 11:
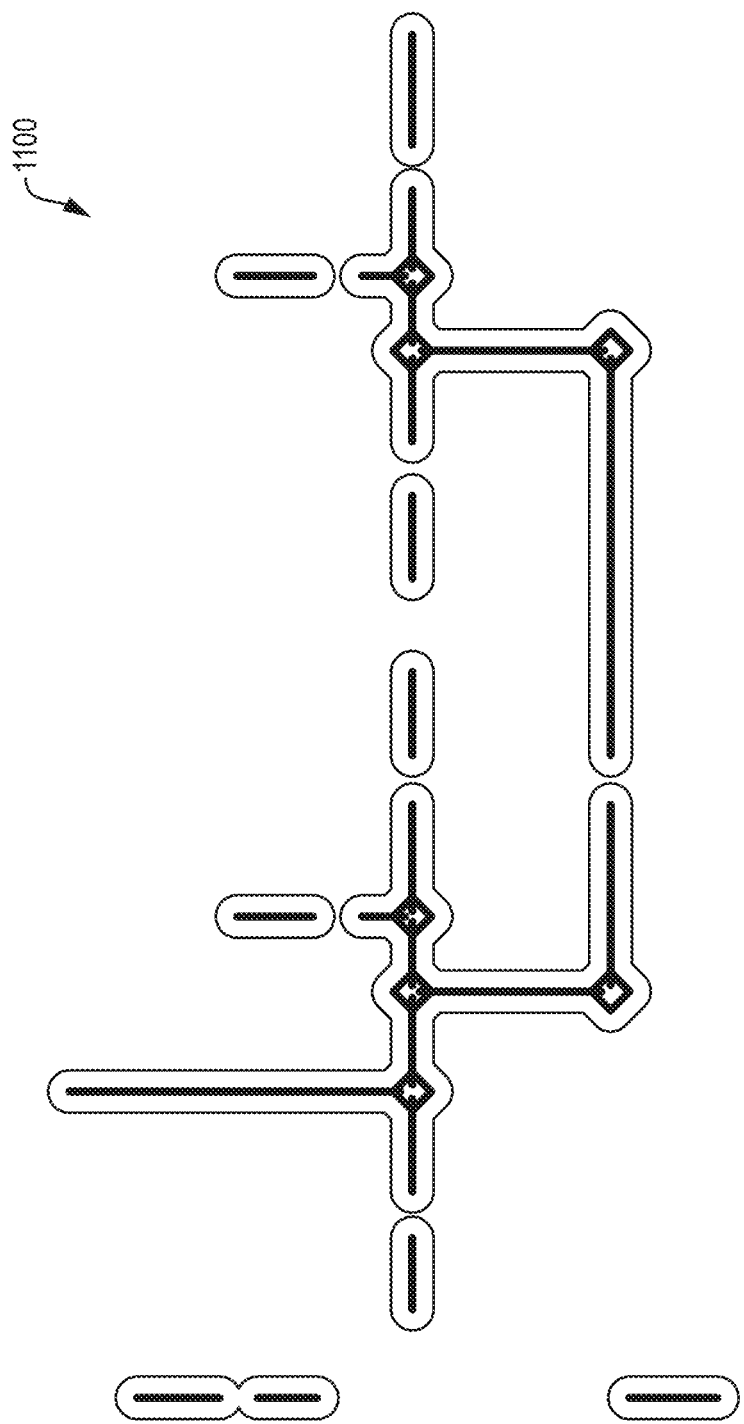
FIG. 11 is a visualization of a portion of an example graph skeleton that may be generated as part of a sub-step of FIG. 10.

At sub-step 1030, the signal processing module 236 vectorizes link segments in the segmentation map (e.g., using thinning, medial-axis/distance transforms, ridge detection, edge detection, Hough transforms, node position refinement, or other techniques). Prior to this sub-step, the predicted links may be several positions (e.g., pixels) wide. The vectorization finds the center of each link create a graph skeleton of the link segments. The vectorization may also identify changes in direction (e.g., an elbow) and insert a node (a regular node) at such locations in the graph skeleton. Similarly, at the end of each link, the vectorization may insert a special node (a single-edge node) in the graph skeleton. FIG. 11 is a visualization 1100 of a portion of an example graph skeleton that may be generated as part of sub-step 1130. The visualization shows the vectorized center of each link as well as inserted nodes (regular and single-edge).

At sub-step 1040, the signal processing module 236 simplifies and repairs the graph skeleton generated in sub-step 1030 to address redundancies and discontinuities (e.g., using line fitting, edge stitching, edge contraction, path compression, or other techniques).

At sub-step 1050, the signal processing module 236 performs an optimization to associate (keypoint match) the nodes of the graph skeleton inserted in sub-step 1030 with associated connection points and floating connection points extracted from the one or more heatmaps as part of step 340 of FIG. 3, and generates a preliminary connection graph (e.g., using linear sum assignment, linear optimization, path cost minimization, A*-star algorithms, simplex optimization, trust region search algorithms, or other techniques). The optimization may involve associating the single-edge nodes in the graph skeleton with associated connection points from the one or more heatmaps. It may further involve associating regular nodes in the graph skeleton with floating connection points from the one or more heatmaps. To do so, a cost may be added to every possible association. A globally optimal cost minimum may then be determined. In order to deal with false positives for associated connection points and floating connection points, the signal processing module 236 may allow for associating them to a "dummy node" in the segmentation map (which implies they should be deleted). Similarly, in order to deal with false negatives for associated connection points and floating connection points, the signal processing module 236 may create additional nodes in the segmentation map if there is a high level confidence and associate to them.

At sub-step 1060, the signal processing module 236 cleans and refines the preliminary connection graph and then generate a final graph connectivity matrix therefrom. The cleaning and refining may involve applying predefined connection rules, removing cycles, removing redundant paths, removing self-loops, removing dangling branches and the like.

Returning to FIG. 3, at step 360, the schematic diagram data extraction application 200 associates links in the description of links and connectivity with respective tags and/or sets of properties. Some properties, such as link type and flow direction may have been predicted by the link segmenter 232. Tags and other properties may have been determined by a separate ML-based symbol detection workflow. One example ML-based symbol detection workflow that may determine tags and other properties is described in U.S. patent application Ser. No. 17/129,205, which has been incorporated by reference herein.

At step 370, the schematic diagram data extraction application 200 outputs (e.g., stores to memory, displays on a screen or transmits over a network) a description of links and connectivity in a machine-readable format. Such description may take the form of a JSON file that includes the data of the graph connectivity matrix along with attributes for each link indicating associated tags or sets of properties.

In summary, the above description details example techniques for extracting links and connectivity from a schematic diagram in an image-only format that may address many of the shortcomings of prior attempts. It should be understood that various adaptations and modifications may be readily made from these techniques, to suit various implementations and environments. While it is discussed above that many aspects of the techniques are implemented by specific software processes executing on specific hardware, it should be understood that some or all of the techniques may also be implemented by different software on different hardware. In addition to general-purpose computing devices, the hardware may include specially configured logic circuits and/or other types of hardware components. Above all, it should be understood that the above descriptions are meant to be taken only by way of example.

The invention claimed is:

1. A method for extracting links and connectivity from a schematic diagram in an image-only format, comprising:

producing, using a first machine learning (ML) model executing on one or more computing devices, a first set of predictions about positions of link segments in the schematic diagram;

producing, using a second ML model executing on the one or more computing devices, a second set of predictions about starting and stopping points of link segments in the schematic diagram;

performing an optimization, by a signal processing module executing on the one or more computing devices, to combine the first set of predictions about the positions of link segments and the second set of predictions about starting and stopping points of link segments to produce a description of links and connectivity they provide between symbols in the schematic diagram, wherein the optimization associates portions of link segments with starting and stopping points, applies a cost to each possible association, and selects a set of associations that provides a globally optimal cost minimum; and outputting the description of links and connectivity in a machine-readable format.

2. The method of claim 1, wherein the first set of predictions about the positions of link segments comprises a segmentation map that, for each position in the schematic diagram, indicates a probability the position in the schematic diagram is part of a link.

3. The method of claim 1, wherein the first ML model that produces the first set of predictions about the positions of link segments is structured according to a convolutional neural network architecture adapted for semantic segmentation.

4. The method of claim 1, wherein the first ML model consumes, in addition to the schematic diagram in the image-only format, a mask of detected symbols in the schematic diagram.

5. The method of claim 1, wherein the second set of predictions about the positions of link segments is based on one or more heatmaps that, for each position in the schematic diagram, indicates a probability the position in the schematic diagram is a connection point.

6. The method of claim 1, wherein producing the second set of predictions about starting and stopping points of link segments, further comprises:
   classifying the starting and stopping points as either an associated connection point or a floating connection point,
   wherein the second set of predictions about starting and stopping points of link segments is based on a first heatmap that, for each position in the schematic diagram, indicates a probability the position in the schematic diagram is an associated connection point, and a second heatmap that, for each position in the schematic diagram, indicates a probability the position in the schematic diagram is a floating connection point.

7. The method of claim 1, wherein the second ML model that produces the second set of predictions about starting and stopping points of link segments is structured according to a deep neural network architecture adapted for anchorless object detection.

8. The method of claim 1, wherein the second ML model consumes, in addition to the schematic diagram in the image-only format, a mask of detected symbols in the schematic diagram and one or more masks of detected text regions in the schematic diagram.

9. The method of claim 1, wherein the description of links and connectivity comprises a graph connectivity matrix that indicates, for each symbol in the schematic diagram, which other symbols it is connected to by a link.

10. The method of claim 1, wherein the performing an optimization comprises:
    vectorizing the link segments in the first set of predictions and inserting nodes,
    wherein and the portions of link segments that the optimization associates with starting and stopping points are the nodes inserted into the first set of predictions.

11. The method of claim 1, further comprising:
    predicting, using the first ML model, a link type based on a visual appearance of one or more line segments depicting the link in the schematic diagram; and
    associating at least one link in the description of links and connectivity with a respective link type.

12. The method of claim 1, further comprising:
    predicting, using the first ML model, a flow direction based on a visual appearance of an arrow of a line segment depicting the link in the schematic diagram; and
    associating at least one link in the description of links and connectivity with a respective flow direction.

13. The method of claim 1, wherein the machine-readable format is a JavaScript Object Notation (JSON) file.

14. A computing device comprising:
    a display screen;
    a processor; and
    a memory coupled to the processor and configured to store a schematic diagram in an image-only format and a schematic diagram data extraction application that includes a first machine learning (ML) model and a second ML model, the schematic diagram data extraction application when executed operable to:
        predict, using the first ML model, a set of link segments to produce a segmentation map that indicates positions of link segments;
        predict, using the second ML model, a set of discrete connection points from the schematic diagram to produce one or more heatmaps that indicate positions of starting and stopping points of link segments;
        perform an optimization to combine the segmentation map and data from the one or more heatmaps to produce a description of links and connectivity they provide between symbols in the schematic diagram, wherein the optimization associates portions of link segments from the segmentation map with the starting and stopping points of link segments from the one or more heatmaps, applies a cost to each possible association, and selects a set of associations that provides a globally optimal cost minimum; and
        output the description of links and connectivity in a machine-readable format.

15. The computing device of claim 14, wherein the segmentation map, for each position in the schematic diagram, indicates a probability the position in the schematic diagram is part of a link, and the one or more heatmaps, for each position in the schematic diagram, indicates a probability the position in the schematic diagram is a connection point.

16. The computing device of claim 14, wherein the description of links and connectivity comprises a graph connectivity matrix which indicates, for each symbol in the schematic diagram, which other symbols it is connected to by a link.

17. A non-transitory computing device readable medium having instructions stored thereon, the instructions when executed by one or more computing devices operable to:
    produce a first set of predictions about the positions of link segments in the schematic diagram;
    produce a second set of predictions about starting and stopping points of link segments in the schematic diagram;
    combine the first set of predictions and second set of predictions to produce a description of links and connectivity they provide between symbols in the schematic diagram by
        vectorizing the link segments in the first set of predictions and inserting nodes, and
        performing an optimization to associate the nodes inserted into the first set of predictions with starting and stopping points from the second set of predictions, the optimization to associate a cost to each possible association and the optimization to select a set of associations that provides a globally optimal cost minimum; and
    output the description of links and connectivity in a machine-readable format.

18. The non-transitory electronic-device readable medium of claim 17, wherein the first set of predictions about the positions of link segment in the schematic diagram are produced using a first machine learning (ML) model and the second set of predictions about starting and stopping points of link segments in the schematic diagram are produced using a second ML model.

19. The non-transitory electronic-device readable medium of claim 17, wherein the first set of predictions about the positions of link segments comprises a segmentation map that, for each position in the schematic diagram, indicates a probability the position in the schematic diagram is part of a link, and the second set of predictions about the positions of link segments is based on one or more heatmaps that, for each position in the schematic diagram, indicates a probability the position in the schematic diagram is a connection point.

20. The non-transitory electronic-device readable medium of claim 19, wherein the description of links and connectivity comprises a graph connectivity matrix which indicates, for each symbol in the schematic diagram, which other symbols it is connected to by a link.

21. A method for extracting links and connectivity from a schematic diagram in an image-only format, comprising:
producing, using a first machine learning (ML) model executing on one or more computing devices, a first set of predictions about positions of link segments in the schematic diagram;
producing, using a second ML model executing on the one or more computing devices, a second set of predictions about starting and stopping points of link segments in the schematic diagram;
combining, by software executing on the one or more computing devices, the first set of predictions and second set of predictions to produce a description of links and connectivity they provide between symbols in the schematic diagram by
vectorizing the link segments in the first set of predictions and inserting nodes, and
performing an optimization to associate the nodes inserted into the first set of predictions with starting and stopping points from the second set of predictions, the optimization to associate a cost to each possible association and the optimization to select a set of associations that provides a globally optimal cost minimum; and
outputting the description of links and connectivity in a machine-readable format.

22. The method of claim 21, wherein the first set of predictions about the positions of link segments comprises a segmentation map that, for each position in the schematic diagram, indicates a probability the position in the schematic diagram is part of a link, and the second set of predictions about the positions of link segments is based on one or more heatmaps that, for each position in the schematic diagram, indicates a probability the position in the schematic diagram is a connection point.

23. The method of claim 21, wherein the description of links and connectivity comprises a graph connectivity matrix that indicates, for each symbol in the schematic diagram, which other symbols it is connected to by a link.

* * * * *